F. H. DUC.
Ice-Cream Freezer.
No. 68,968.　　　　　　　　　　　　Patented Sept. 17, 1867.
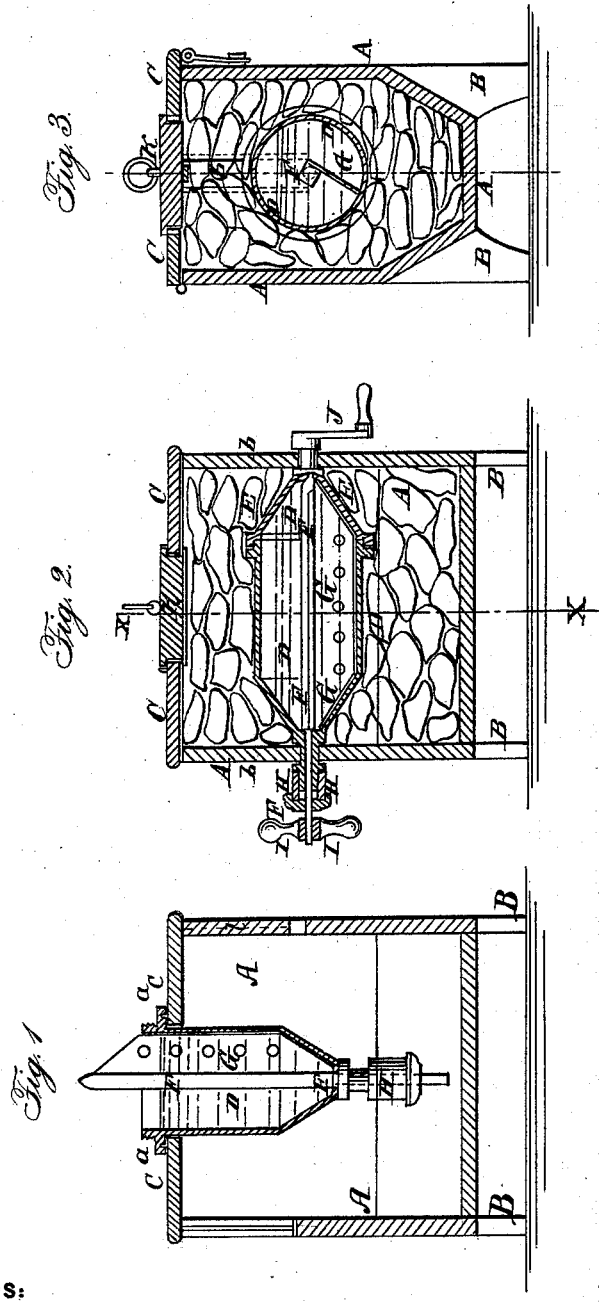
Witnesses:
Inventor:

United States Patent Office.

FRANCIS H. DUC, OF CHARLESTON, SOUTH CAROLINA.

*Letters Patent No. 68,968, dated September 17, 1867.*

IMPROVED ICE-CREAM FREEZER.

The Schedule referred to in these Letters Patent and making part of the same.

TO ALL WHOM IT MAY CONCERN:

Be it known that I, FRANCIS H. DUC, of Charleston, in the district of Charleston, and State of South Carolina, have invented a new and improved Ice-Cream Freezer; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of my improved ice-cream freezer, showing it while it is being filled.

Figure 2 is a similar view, showing it in working position.

Figure 3 is a vertical cross-section of the latter, the plane of section being indicated by the line $x\ x$, fig. 2.

Similar letters of reference indicate corresponding parts.

This invention relates to a new device for freezing ice-cream, and consists in the use of a revolving cylinder, in which the cream is held, said cylinder being fitted around a stationary shaft, which carries a wing for feeling or indicating the state of the contents. All the parts constituting this device can be taken apart for cleaning and other purposes. The cylinder is fitted in a box, in which it has its bearings, and in which it is fitted vertically when to be filled, and horizontally while being turned.

A represents a box, made of wood or other suitable material, of sufficient size, and of rectangular or other suitable form. It is, or may be, supported upon legs B B, of suitable height, and is provided with a hinged cover, C, as shown. D is a cylinder, made of sheet metal or other suitable material, having conical heads, as shown in fig. 2. One of these heads E is screwed upon the cylinder, and can be unscrewed from the same, as in fig. 1. Through the opposite fixed head passes a shaft, F, which carries a perforated wing, G, as shown. A stuffing-box, H, keeps the joints around the shaft F closed. On the extreme end of the shaft F is a handle, I, by which it can be turned. On the removable head E is a crank, T, by which the whole cylinder can be turned. A hole is provided in the centre of the cover C of the box A large enough to allow the cylinder to be passed through it. A flange on the latter rests upon the cover, and fits over two or more pins $a$ that are provided in the cover to prevent the cylinder from turning. The covering head E is then unscrewed from the cylinder, as in fig. 1, and the same can be filled. When the cylinder is filled the head E is screwed down again, and the cylinder is taken out of the box A. The cover of the latter is opened, and the cylinder placed into it in a horizontal position, the cylindrical ends of its heads sliding down in recesses provided for that purpose in the ends of the box, which recesses are closed, after the cylinder is inserted, by means of sliding plates $b\ b$, as shown (partly in dotted lines) in fig. 3. Ice is then packed into the box A, so as to surround the cylinder, the cover C is let down, and the hole in its centre is closed by a suitable plate, K, (figs. 2 and 3.) The cylinder is then revolved by means of the crank T. The shaft F is now and then turned, by means of the handle I, to ascertain the condition of the contents of the cylinder. When it is very hard to turn it is a sign that the cream is frozen, as the wing G meets with more resistance; and, when the cream is sufficiently frozen, the cover C is opened, the cylinder taken out and replaced into the vertical position, as shown in fig. 1, the head E is unscrewed, and the contents are removed. The shaft F can then be easily drawn out, and the whole be cleaned with facility.

Having thus described my invention, what I claim as new, and desire to secure by Letters Patent, is—

1. The revolving cylinder D, when provided with the removable head E, shaft F, and wing G on the latter, the said shaft and wing serving as an indicator for ascertaining the state of the contents, substantially as herein shown and described.

2. The above, in combination with the box A, having a hinged cover, C, in which another central cover, K, is arranged, substantially as and for the purpose herein shown and described.

FRANCIS H. DUC.

Witnesses:
ASHER D. COHEN,
R. S. BEMIS.